United States Patent
Keithley

(10) Patent No.: US 6,937,758 B2
(45) Date of Patent: Aug. 30, 2005

(54) METHOD AND APPARATUS FOR REPRODUCING SEPIA-TONE IMAGES

(75) Inventor: Douglas G. Keithley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 09/924,202

(22) Filed: Aug. 7, 2001

(65) Prior Publication Data

US 2003/0031362 A1 Feb. 13, 2003

(51) Int. Cl.$^7$ .................................................. G06K 9/00
(52) U.S. Cl. ........................ 382/167; 348/33; 358/520
(58) Field of Search ................................ 382/162–164, 382/167, 171, 172, 274, 275, 321, 324; 250/330–333; 348/33, 164; 358/461, 466, 474, 483, 518–522

(56) References Cited

U.S. PATENT DOCUMENTS

| | | | |
|---|---|---|---|
| 4,967,276 A | * | 10/1990 | Murakami et al. .......... 348/164 |
| 5,287,418 A | | 2/1994 | Kishida ........................ 382/50 |
| 5,796,865 A | | 8/1998 | Aoyama et al. ............. 382/169 |
| 5,841,897 A | | 11/1998 | Numakura et al. ......... 382/163 |
| 5,870,077 A | * | 2/1999 | Dillinger et al. ............ 345/600 |
| 5,995,665 A | * | 11/1999 | Maeda ........................ 382/232 |
| 6,040,905 A | * | 3/2000 | Cheng et al. ............. 356/238.3 |
| 6,043,900 A | | 3/2000 | Feng et al. .................. 358/1.9 |
| 6,094,281 A | * | 7/2000 | Nakai et al. ................. 358/512 |
| 6,144,763 A | | 11/2000 | Ito ............................. 382/166 |
| 6,198,503 B1 | * | 3/2001 | Weinreich .................... 348/164 |
| 6,486,981 B1 | * | 11/2002 | Shimura et al. ............. 358/500 |
| 6,501,865 B1 | * | 12/2002 | Tanaka et al. .............. 382/312 |
| 6,580,824 B2 | * | 6/2003 | Deng et al. ................. 382/165 |
| 2003/0112863 A1 | * | 6/2003 | Demos .................. 375/240.01 |

* cited by examiner

*Primary Examiner*—Bhavesh M. Mehta
*Assistant Examiner*—Yubin Hung

(57) ABSTRACT

Reproducing sepia tone images. The image is scanned using conventional RGB light and added infrared wavelengths. Using L*a*b* color coordinate system, "L"-channel values are determined by the infrared channel only, and "a" and "b" channels are filled with respective benchmark values that represents the yellow-brown sepia background tone of the original. This new L*a*b* data is converted to appropriate output device color space.

2 Claims, 2 Drawing Sheets

METHOD AND APPARATUS FOR REPRODUCING SEPIA-TONE IMAGES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION

1. Field of the Invention

The present invention relates generally to scanning and copying documents and, more particularly, to a method and apparatus for reproducing sepia-tone original documents.

2. Description of Related Art

Optical scanners have long been used to capture existing images so that they may be copied, transferred, stored, and even digitally manipulated. A scanner captures the image by illuminating the image with a light source and sensing reflected light. The presence or absence of reflected light at a particular point (picture element or "pixel") determines the image characteristics at that point. For a black and white image, the absence of reflected light indicates a black point and presence indicates a white point. For gray scale images, the intensity of the reflected light is measured to determine the intensity of the image at that point. In the case of color, separate light sources or filters are used to detect the presence or absence of each color component.

Document reproduction using commercially available copiers, scanners, and digital senders is progressing toward affordable, full-color, faithful duplication. It is known in the art to use primary color (red (R), green (G), blue (B)) scanning technology to render acquired data as a "faithful" reproduction, that is, producing a copy of the original exactly as it appears, whether or not there are areas of the document which have defects or artifacts.

Aged historical documents and photographs are often sepia tone. Certain modern "black and white" photographic films, specifically those that are amenable to convenient, automated, "one-hour," color photoprocessing and color photopaper printing, generally render the original black-and-white negatives as sepia tone prints. The use of an RGB scanner for sepia tone originals, particularly where the original is damaged, does not render a desirable reproduction. If the image has aging artifacts, these defects are faithfully copied. For example, when a sepia tone photograph ages, the original "black" areas (full shadow) start to turn blue. The blue areas can be much lighter than the intended black, greatly reducing image quality. Using a color copier, any defects are also faithfully reproduced; namely the faded area appears as a noticeable blue area. If a black-and-white scanning-copying is performed, the reproduction is no longer a sepia print. Moreover, defects such as faded regions now appear too light.

Colorimetry has long been recognized as a complex science. Essentially, as defined in 1931 by the Commission Internationale L'Eclairage (CIE), three primary colors (X, Y, Z) can be combined to define all light sensations we experience with our eyes; that is, the color matching properties of an ideal trichromatic observer defined by specifying three independent functions of wavelength that are identified with the ideal observer's color matching functions form an international standard for specifying color. In general, it has been found possible and convenient to represent color stimuli vectors by a three-dimensional spatial construct, called a tristimulus space or a color space. The fundamentals of such three-dimensional constructs are discussed in the literature, such as *Principles of Color Technology*, by Billmeyer and Saltzman, published by John Wiley & Sons, Inc., NY, copyright 1981 (2d. ed.) and *Color Science: Concepts and Methods, Quantitative Data and Formulae*, by Wyszecki and Stiles, published by John Wiley & Sons, Inc., copyright 1982 (2d ed.), see e.g., pages 119–130.

A variety of trichromatic model systems provide alternatives for both the hardware and software system designers—e.g., the red, green, blue (RGB) model commonly used in computer video displays; the cyan, magenta, yellow (and black) (CMY(K)) model used extensively in color hard copy apparatus; the hue, saturation, value (HSV) model; the hue, lightness, saturation (HLS) model; the luminance, red-yellow scale, green-blue scale (L*a*b*) model; the YIQ model used in commercial color television broadcasting; and others. Such works as *Fundamentals of Interactive Computer Graphics*, by Foley and Van Dam, Addison-Wesley Publishing Company, see e.g., pages 606–621, describe a variety of tri-variable color models.

Color input and output devices—such a scanners, cathode ray tube (CRT) video monitors, and printers—present color images in a device-dependent fashion. Color model system data point values (voltage levels or other input signal functions, referred to hereinafter as data triplets or color coordinates) are digitally stored in a frame buffer. Color transformation (also referred to in the art as color correction and cross-rendering) between model systems in digital data processing presents many problems to the original equipment manufacturer. The transformation of data from one device to another device is difficult because the color matching relationship between those systems are generally non-linear. For most applications, a crucial problem is the maintaining of color integrity between an original image from an input device (such as a color scanner, CRT monitor, digital camera, computer software/firmware generation, and the like) and a translated copy at an output device (such as a CRT monitor, color laser printer, color ink-jet printer, and the like); i.e., presenting a "faithful" reproduction. A transformation from one color space to another requires complex, non-linear computations in multiple dimensions. Since such is not describable mathematically, it is known to use very large look-up tables to approximate a transformation between trichromatic model systems to correlate the wide spectrum of color hues that exist. A lookup table of input versus output data can be generated for any set of devices. There are a variety of methods for building a device-dependent look-up table for a particular device. The 1975 U.S. Pat. No. 3,893,166 to Pugsley provides an example. Other, more modern, conversion techniques are described in Dillinger et al., U.S. Pat. No. 5,870,077 for a METHOD FOR TRISTIMULUS COLOR DATA NON-LINER STORAGE, RETRIEVAL, AND INTERPOLATION; U.S. Pat. No. 5,748,176 by Gondek for a MULTI-VARIABLE COLORIMETRIC DATA ACCESS BY ITERATIVE INTERPOLATION AND SUBDIVISION; and U.S. Pat. No. 5,732,151 by Moon et al. for a COMPUTERIZED MEMORY MAPPING METHOD FOR TRANSFORMING COLOR DATA (each assigned to the common assignee herein and incorporated by reference hereby).

There is a need for methods and apparatus for sepia tone reproduction, providing image quality equal to the original document when new, correcting for image artifacts and defects caused by the aging process.

BRIEF SUMMARY OF THE INVENTION

In its basic aspect, the present invention provides a method for reproducing a sepia tone image, the method including: scanning said sepia tone image with visible light and infrared light; using data associated with infrared light reflected from the image and data associated with visible light reflected from the image, creating adjusted data; and outputting a reproduction image using said adjusted data.

In another aspect, the present invention provides a sepia tone scanner including: illuminating mechanisms for scanning a document with visible light and infrared radiation; mechanisms for receiving data representative of reflected visible light and data representative of reflected infrared radiation; and mechanisms for adjusting said data representative of reflected visible light using said data representative of reflected infrared radiation.

In still another aspect, the present invention provides a computer memory device including: computer code for receiving data representative of reflected visible light and data representative of reflected infrared radiation; and computer code for adjusting said data representative of reflected visible light using said data representative of reflected infrared radiation.

The foregoing summary is not intended to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 3, 4 and 5 are a block diagram of the methodology in accordance with the present invention in which:

FIG. 3 is a diagram of the basic methodology,

FIG. 4 is a subsidiary diagram of FIG. 3 for background determination, and

FIG. 5 is a subsidiary diagram of FIG. 3 for data replacement.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated for practicing the invention. Alternative embodiments are also briefly described as applicable.

Figure 1:
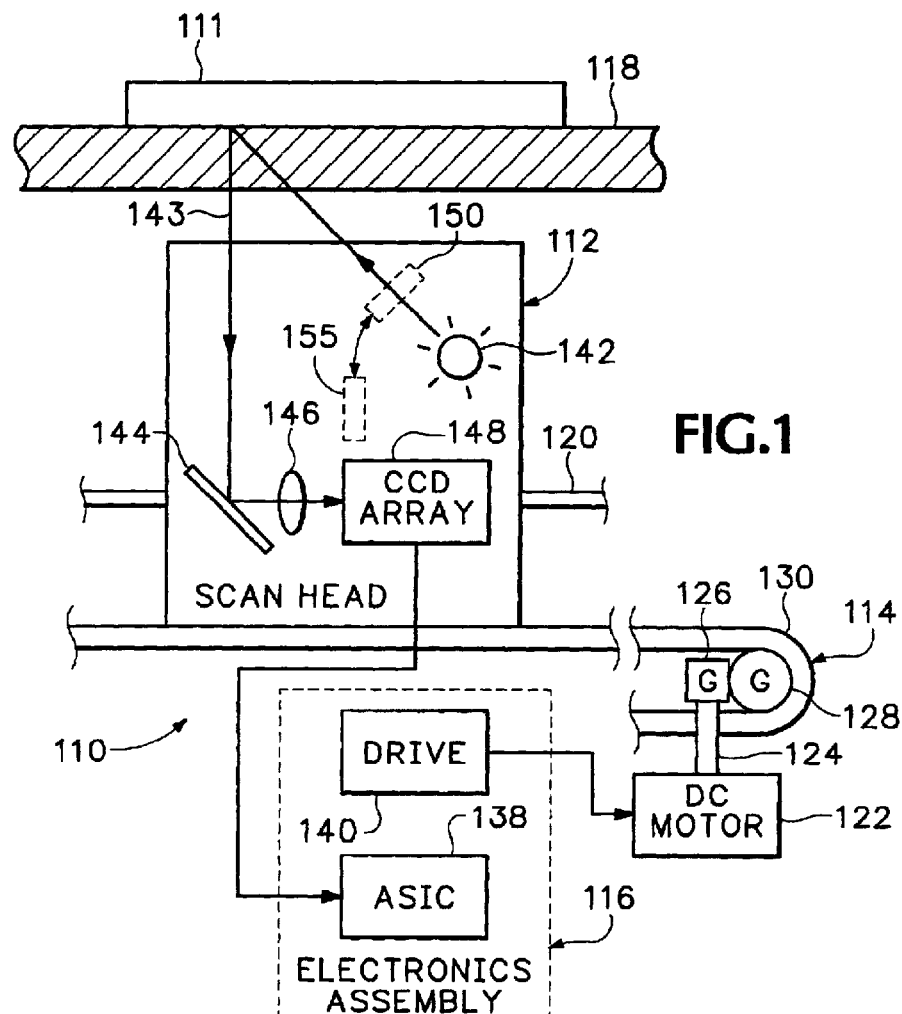
FIG. 1 is a block diagram of a scanner apparatus in accordance with the present invention.

FIG. 1 is a schematic diagram of an exemplary embodiment of a scanning apparatus in accordance with the present invention, with a target image on a sheet of media 111 mounted on a clear platen 118. A scan head 112 is mounted 120 for translation with respect to the media 111, which is appropriately positioned on the platen 118. A scan head drive mechanism 114, having a reversible DC motor 122, a drive shaft 124, a transmission having a drive train, e.g., gears 126, 128, and a drive belt 130 coupled to the drive shaft via the drive train, provides the necessary scan head 112 bidirectional motion. It should be noted that the apparatus 110 can be arranged for moving the image relative to a stationary scan head, moving the media with respect to a stationary head, or non-scanning full-page head implementations. A controller 116 provides data processing electronics (e.g., an application specific integrated circuit (ASIC)) 138 and transport control drive mechanisms 140 as would be known in the art.

The scan head 112 includes a light source 142 for illuminating the image (see Background). Light projected (e.g., via known manner lens or light pipe(s)) and transmitted (represented by arrow 143) through the glass platen 118 onto the media 111 is reflected back onto an appropriately place mirror 144. Again in a known manner, light is reflected by the mirror 144 through lenses (or light pipe(s)) 146 onto a charge coupled device (CCD) array 148 where the received light is converted to a digital signals and transmitted to the data processing electronics 138. Note that it is known in the art to also use alternative light sensing analog-to-digital converting devices, such as those implemented in CMOS technology and the like, which still in accordance with the present invention may be employed alternatively to the CCD array.

In accordance with the present invention, in addition to projecting visible light in a known manner, the light source 142 includes infrared wavelength light. This can be implemented for example by the use of a red light emitting diode (RLED), a blue light emitting diode LED (BLED), a green light emitting diode (GLED), and an infrared light emitting diode (IRLED). Reflected light 143 is converted into RGB color space coordinates and an IR digital data value for each pixel at a fixed or adjustable resolution.

It should be noted here that conventional flourescent bulb scanners intentionally filter out the infrared wavelength band. In conventional scanning, infrared tends to cause image artifacts in certain media. However, with sepia tones, it has been found that infrared radiation is selective advantageously; for example, an IR channel appears to be insensitive to bluish coloration defects. On the other hand, at the same time, it is sensitive to pigmentation variations of interest.

Figure 2:
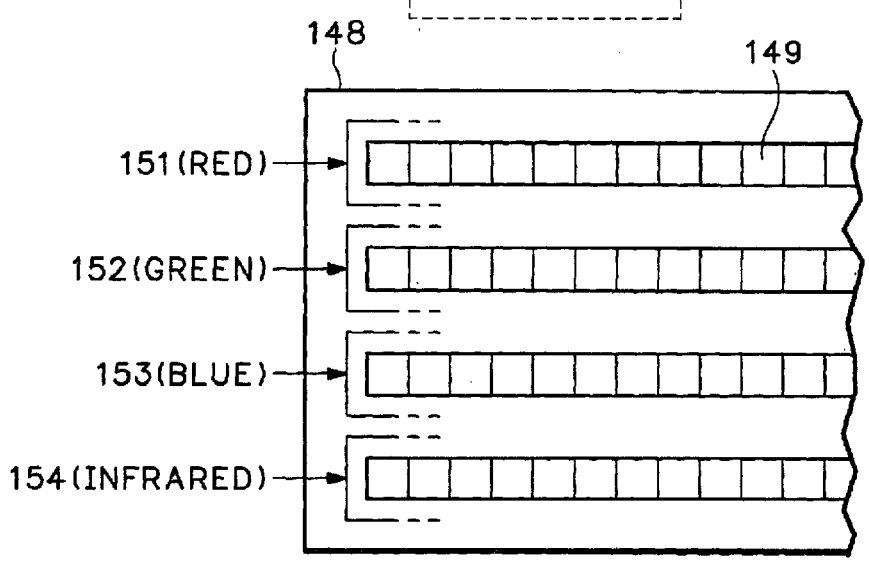
FIG. 2 is a partial elevation schematic of a CCD array in accordance with the present invention as shown in FIG. 1.

Turning to FIG. 2, the CCD array 148 has four channels; four rows of individual CCD sensors 149. In a state of the art conventional color scanning apparatus, a filter set comprising of color filters, RED 151, GREEN 152, and BLUE 153, overlays a respective row of sensors; a fourth row of sensors having no filter is sometimes provided for monochrome document scanning. In accordance with the present invention, an infrared filter 154 is provided as the fourth row of filters. The reflected infrared radiation (see e.g., 143 in FIG. 1) received at the CCD array 148 is represented as a single IR data value for each pixel.

In general, several apparatus embodiments can be implemented. A contact image sensor (CIS) scanner apparatus having RGB LEDs for full color reproduction sequentially illuminates the image by turning on different color LEDs. In conjunction with a standard receptor CCD, addition of an infrared LED allows four pass data capture. Reduction Optic Scanners (ROS) are general flatbed type scanners using the CCD technology described hereinabove. Single channel sensor scanners implemented in accordance with the present invention would use a color filter wheel with four filters (R, G, B, IR). Note that a fifth, no-filter, channel can be added for monochrome image scanning in accordance with conventional technology.

In order to allow conventional scanning, in the preferred embodiment of the present invention, an IR filter 150, movable in and out (represented by a double-headed arrow) of the projected light path manually or electromechanically, such as by a controlled solenoid 155 (phantom lines used to indicate that this component is optional, depending upon a specific implementation). The no-filter channel 154 is used as the infrared channel when the IR passing filter 150 blocks all other wavelengths. Alternatively, an IR passing filter can be used similarly in conjunction with the reflected light and CCD array 148.

Figures 3, 4, 5:
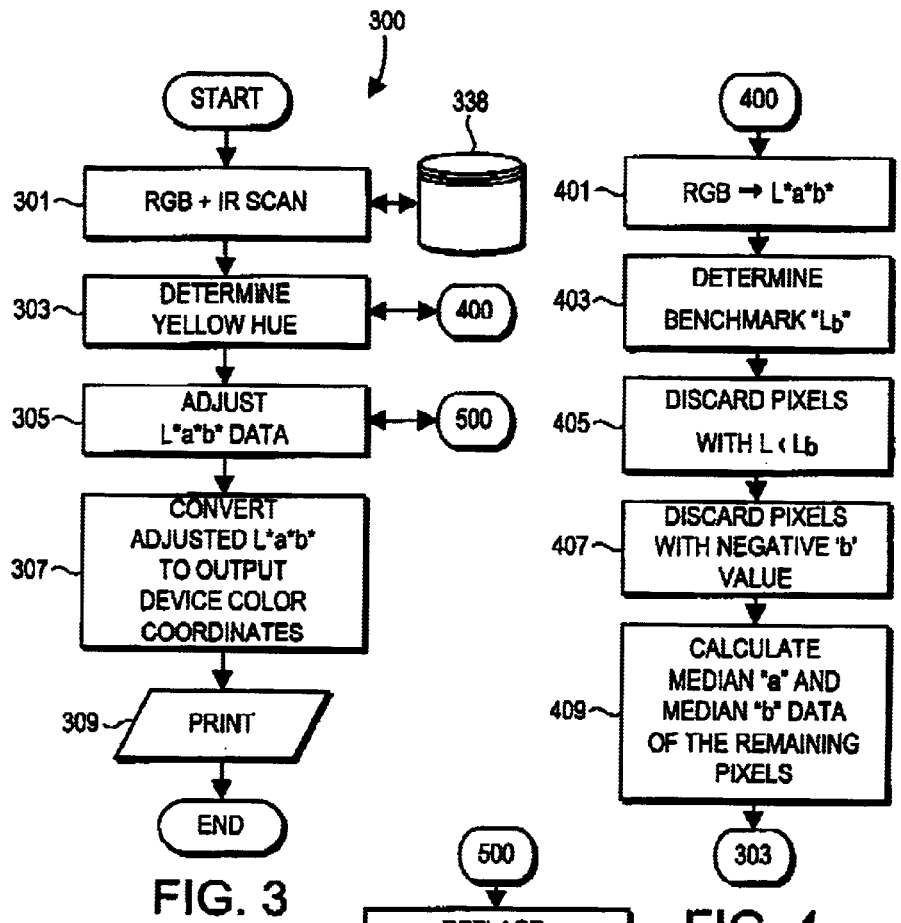

FIG. 3 is a flow chart of the process in accordance with the present invention. The present invention takes advantage of the work done in colorimetry and uses the CIE L*a*b* color space standard (hereinafter simply referred to as "L*a*b*"). The basic method is based on an RGB+IR scan of a sepia tone print. Sequentially illuminating the image with the four LEDs—red, green, blue, and infrared—provides four data sets (channels) of image information.

The first step 301 is to scan the image with the three color LEDs and an IRLED (represented simply as element 142 in FIG. 1). The data is stored in a memory 338 associated with the ASIC 138 (FIG. 1 only). To process the data, the next step is to determine the basic chroma, or shade, of sepia tone that the original document generally displays; i.e., from the RGB data, the basic background hue represented in the original is determined via conventional colorimetry, step 303.

Turning to FIG. 4, the process 400 for determining the background is shown as a flowchart. The RGB data is converted to L*a*b* color space coordinates, step 401. "L" is the intensity coordinate; it is based on the RGB values and represents the lightness-darkness of a pixel of the scanned image. In general it is mostly sensitive to the green channel. Black pixels in a sepia tone image that are fading to blue changes the intended L from a very low value (dark) to a higher value (lighter). Thus, instead of using the true "L" value, the IR data will be substituted.

A benchmark "L" value—such as the median, average, percentage of the range, or other selection criteria—is established; for this exemplary embodiment, the Median L is determined, step 403. All pixels having an L-value less than the benchmark-L, or "$L_b$," are ignored, generally discarded, step 405, with respect to the next steps of the background determination process 400. In the preferred embodiment, the pixel data is so edited by performing a histogram on the L-channel data and removing all the pixels that are darker than the median pixel value.

Next, step 407, since a negative "b" value in L*a*b* color space indicates blue, all blue pixels are discarded.

Next, step 409, using now only the remaining pixel data, the median (or other benchmark) value of "a" and "b" for those remaining pixels is calculated. The median "a" and "b" values define the background hue of the sepia image, ranging from white to yellow, including all the sepia shades therebetween.

Returning to FIG. 3, the next step, 305, is to manipulate the L*a*b* color space data. Turning to FIG. 5, this process 500 is shown as a subsidiary flowchart.

The first step in adjusting the L*a*b* data is to replace the "a" and "b" data points for each pixel of all the original data, step 501, using the benchmark data, e.g., median values. This will set a uniform sepia hue for the entire image.

Next, step 503, for each pixel of the original, the "L" value is replaced with the IR data for the respective pixel. The range of the infrared channel should be matched to the range of the original "L" channel. A linear scaling should be performed on the infrared channel, forcing its 1% and 99% points to be the same values as the "L" channels respective 1% and 99% points. For example, note that implemented definitions of L*a*b* systems make the "L" coordinate range from 0–100. Scaling may be required to substitute the IR value for the L value; e.g., IR values could be 0–255 or 0–1024 or some other range depending upon the specific devices employed in the apparatus 110 and programming involved with any specific implementation. All "L" values of blue shaded pixels ("–b" value) were removed, since they would not be properly represented. But note that if the image has significantly degraded, no black pixels may exist in the RGB data, so there would be no black "L" values for reference (in which case factory scaling would be necessary). Scaling of the IR values can be independent of the "L" values and set by the scanner manufacturer.

Returning to FIG. 3, the adjusted L*a*b* color space data is converted to an output device (not shown) color system, step 307, which is device dependent; e.g., for an ink-jet printer the L*a*b* data is converted to subtractive primary color space data (cyan, yellow, magenta, black; CYMK). The converted data can be stored in the memory 338 and output to render a print.

Based on the adjusted and converted data, the output device will now render, step 309, a sepia tone reproduction that is more faithful to the original image when it was new rather than to the actual, possibly degraded, original document which was scanned. If it is desirable to lighten, darken or enhance contrast, (L channel) this is accomplished with conventional colorimetry techniques, only shifting the adjustments to the corrected channel data.

It should be recognized that all process steps can be automated as a computer software or firmware program.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . ." and no process step herein is to be construed under those provisions unless the step or steps are expressly recited using the phrase "comprising the step(s) of . . . ."

What is claimed is:

1. A method for producing a reproduction of a sepia-tone image, the sepia-tone image having original sepia-tones which have degraded due to aging, the method comprising:

scanning said sepia-tone image with visible light and infrared light;

using data associated with visible light reflected from the image and data associated with infrared light reflected from the image, creating adjusted data by:

transforming the data associated with visible light reflected from the image to a L*a*b* color coordinate system, where 'L'=luminance value, 'a'=red-yellow value, and 'b'=green-blue value;

calculating a benchmark 'a' value and a benchmark 'b' value for the image from the transformed data associated with visible light reflected from the image, while excluding from the calculation data having either:

an 'L' value less than a benchmark 'L' value, or a negative 'b' value;

replacing 'a' values in the transformed data with said benchmark 'a' value;

replacing 'b' values in the transformed data with said benchmark 'b' value;

replacing the 'L' values of the data with data associated with infrared light reflected from the image;

converting the adjusted date to a color coordinate system of an output device; and outputting the converted data to the output device.

2. The method of claim 1, wherein calculating a benchmark 'a' value comprises calculating a median 'a' value of the data not excluded from the calculation, and calculating a benchmark 'b' value comprises calculating a median 'b' value of the data not excluded from the calculation.

* * * * *